United States Patent
Rosenberg

(10) Patent No.: US 9,696,056 B1
(45) Date of Patent: Jul. 4, 2017

(54) HVAC CONDITION BASED MAINTENANCE SYSTEM AND METHOD

(71) Applicant: Gary C. Rosenberg, Safety Harbor, FL (US)

(72) Inventor: Gary C. Rosenberg, Safety Harbor, FL (US)

(73) Assignee: System ProWorks, Inc, Clearwater, FL (US)

( * ) Notice: Subject to any disclaimer, the term of this patent is extended or adjusted under 35 U.S.C. 154(b) by 0 days.

(21) Appl. No.: 15/143,465

(22) Filed: Apr. 29, 2016

(51) Int. Cl.
*G06F 19/00* (2011.01)
*F24F 11/00* (2006.01)
*G05B 19/048* (2006.01)

(52) U.S. Cl.
CPC ........ *F24F 11/0086* (2013.01); *G05B 19/048* (2013.01); *F24F 2011/0091* (2013.01); *G05B 2219/2614* (2013.01)

(58) Field of Classification Search
CPC .......... F24F 11/0086; F24F 2011/0091; G05B 19/048; G05B 2219/2614
USPC ........................................ 700/245, 275–295
See application file for complete search history.

(56) References Cited

U.S. PATENT DOCUMENTS

| | | | | |
|---|---|---|---|---|
| 2007/0012052 A1* | 1/2007 | Butler | ................. | F24F 11/0009 62/181 |
| 2008/0315000 A1* | 12/2008 | Gorthala | ............ | B60H 1/00785 236/46 C |
| 2010/0280788 A1* | 11/2010 | Bohan | .................. | F24F 11/001 702/130 |
| 2012/0221150 A1* | 8/2012 | Arensmeier | ....... | G05B 23/0224 700/276 |
| 2013/0211797 A1* | 8/2013 | Scolnicov | .............. | G06Q 50/06 703/2 |
| 2014/0074730 A1* | 3/2014 | Arensmeier | ......... | F24F 11/0086 705/305 |
| 2014/0262134 A1* | 9/2014 | Arensmeier | ............. | F24F 11/02 165/11.2 |
| 2014/0266755 A1* | 9/2014 | Arensmeier | ......... | F24F 11/0086 340/679 |
| 2015/0260424 A1* | 9/2015 | Fadell | .................. | F24F 11/0012 236/1 C |

\* cited by examiner

*Primary Examiner* — Ziaul Karim
(74) *Attorney, Agent, or Firm* — Sandra L. Layer

(57) ABSTRACT

The HVAC condition based maintenance system and method provides for a system to reduce operating costs by replacing existing time based scheduled maintenance with an on-condition based maintenance system and method for continuous monitoring and acquiring condition based data from an operating HVAC system, transmitting data to a remote server for storage, analysis and trending, recognizing operational performance reductions based on the comparison of current trending to historical data, and for triggering notification of failures and corrective action based on routine, impending and immediate problem recognition. Additionally, the acquired data is used to derive actual heat load characteristic of the building, identify HVAC system deficiencies, building deficiencies and installation issues and load imbalance of multi-unit systems providing direction for system improvements.

6 Claims, 3 Drawing Sheets

HVAC CONDITION BASED MAINTENANCE SYSTEM AND METHOD

BACKGROUND OF THE INVENTION

Field of the Invention

The present invention relates to a Heating, Ventilation, and Air Conditioning (HVAC) condition based maintenance system and method and more particularly pertains to a condition based maintenance system for continuously monitoring operating HVAC condition data, identifying routine, impending and immediate problems, transmitting data to a remote server for analysis and trending, and for triggering notification of impending and immediate failures and corrective action based on routine, impending and immediate problem recognition, operational data analysis and comparison of current trending to historical data.

Description of the Prior Art

The use of HVAC maintenance monitoring systems is known in the prior art. More specifically, HVAC maintenance monitoring systems previously devised and utilized for the purpose of monitoring HVAC systems are known to consist basically of familiar, expected, and obvious structural configurations, notwithstanding the myriad of designs encompassed by the crowded prior art which has been developed for the fulfillment of countless objectives and requirements.

Byway of example, U.S. Pat. No. 6,385,510 to Hoog and Knobloch discloses an HVAC Remote Monitoring System. U.S. Pat. No. 9,092,040 to Fadell, Matsuoka, Rogers and Sloo discloses HVAC Filter Monitoring. United States Publication Number 2012/0221150 to Arensmeier discloses a Residential Solutions HVAC Monitoring and Diagnosis. Lastly, U.S. Pat. No. 8,560,127 to Leen, Zywicki and Schnell discloses an HVAC Control with Comfort/Economy Management.

While these devices fulfill their respective, particular objectives and requirements, the aforementioned patents do not describe HVAC condition based maintenance system and method that allows for continuously monitoring operating HVAC condition data, identifying routine, impending and immediate problems, transmitting data to a remote server for analysis and trending, and for triggering notification of failures and corrective action based on routine, impending and immediate problem recognition, operational data analysis and comparison of current trending to historical data.

In this respect, the HVAC condition based maintenance system and method according to the present invention substantially departs from the conventional concepts and designs of the prior art, and in doing so provides an apparatus primarily developed for the purpose of continuously monitoring operating HVAC condition data, identifying routine, impending and immediate problems, transmitting data to a remote server for analysis and trending, and for triggering notification of failures and corrective action based on routine, impending and immediate problem recognition, operational data analysis and comparison of current trending to historical data.

Therefore, it can be appreciated that there exists a continuing need for a new and improved HVAC condition based maintenance system and method which can be used for continuously monitoring operating HVAC condition data, identifying routine, impending and immediate problems, transmitting data to a remote server for analysis and trending, and for triggering notification of failures and corrective action based on routine, impending and immediate problem recognition, operational data analysis and comparison of current trending to historical data. In this regard, the present invention substantially fulfills this need.

SUMMARY OF THE INVENTION

In view of the foregoing disadvantages inherent in the known types of HVAC maintenance monitoring systems now present in the prior art, the present invention provides an improved HVAC condition based maintenance system and method. As such, the general purpose of the present invention, which will be described subsequently in greater detail, is to provide a new and improved HVAC condition based maintenance system and method which has all the advantages of the prior art and none of the disadvantages. To attain this, the present invention essentially comprises an HVAC condition based maintenance system comprising a data acquisition device installed within an HVAC system, the data acquisition device comprising a plurality of data monitors for detecting environmental and operating conditions of the HVAC system. A network interface device connects the data acquisition device to a communication network. The data acquisition device has a processor adapted for reading the environmental and operational data from the data monitors, analyzing data to recognize immediate problem indicators and saving the data. The data is stored in memory resident on the device. Data is transmitted over the communication network based on detected operational and environmental changes, periodically and when faults are detected.

A remote server is configured with a database for storing transmitted data, a process for analyzing data, determining trends, comparing current trends to historical data and recognizing fault indicators and a means for transmitting notifications based on recognized fault indicators. The process for analyzing data is comprised of algorithms to recognize immediate problem indicators, impending fault indicators and operating deficiencies based on current operating parameters, operational data and environmental data and the comparative analysis of changes in current operating parameters and trends compared to historical operating parameters and trends of the HVAC system.

A performance monitoring method for identifying performance reductions and existing failures, predicting impending failures and impending collateral damage, and generating a proactive on condition maintenance response to identified contacts based on the system is also provided. The method comprising steps to detect, store, transmit and analyze HVAC data by servicing the HVAC system to optimize system performance, installing the data acquisition device within the HVAC system, establishing a connection to the remote server over a communication network, detecting, analyzing, storing and transmitting data from the data acquisition device to the remote server. The remote server receives, analyzes, stores, and compares the data, creating and sending notification of maintenance requirements based on recognized operational issues.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved HVAC condition based maintenance system and method which has all of the advantages of the prior art HVAC maintenance monitoring systems and none of the disadvantages.

It is another object of the present invention to provide a new and improved HVAC condition based maintenance system and method which may be easily and efficiently manufactured, marketed, and installed without contributing to additional maintenance.

It is further object of the present invention to provide a new and improved HVAC condition based maintenance system and method which is of durable and reliable constructions.

An even further object of the present invention is to provide a new and improved HVAC condition based maintenance system and method which is susceptible of a low cost of manufacture with regard to both materials and labor, and which accordingly is then susceptible of low prices of sale to the consuming public, thereby making such HVAC condition based maintenance system and method economically available to the buying public.

An even still further object of the current invention is to provide system performance monitoring that can accurately indicate a reduction in HVAC system performance, or an impending failure with collateral damage event to enable a timely proactive "On Condition" maintenance response to save energy, extend system service life and provide uninterrupted building comfort and the lowest total cost of ownership.

Another object of the present invention is to provide an HVAC condition based maintenance system and method that is designed for fail-safe operation and does not impact performance or interfere with the HVAC system operation.

Another object of the present invention is to provide an HVAC condition based maintenance system and method that may be installed as a stand-alone device or integrated into the HVAC equipment controller.

A further still object of the present invention is to provide a condition based maintenance system and method that is compatible with all types of commercial and residential HVAC systems.

Even still another object of the present invention is to provide an HVAC condition based maintenance system and method for continuously monitoring operating HVAC condition data, identifying problem conditions, transmitting data to a remote server for storage, analysis and trending, recognizing operational performance reductions based on the comparison of current trending to historical data and for triggering notification of failures and corrective action based on routine, impending and immediate problem recognition.

An even still further object of the present invention is to provide an HVAC condition based maintenance system and method that allows for continuous improvements and additions to the analysis process without impact to field equipment.

Still another object of the present invention is to provide an HVAC condition based maintenance system and method that derives building heat load based on actual measured system performance to identify building and equipment deficiencies, HVAC installation issues and/or faulty equipment and balance multi-system operations.

Lastly, it is an object of the present invention to provide a new and improved HVAC performance monitoring system and method for identifying performance reductions, impending failures with impending collateral damage and existing failures to permit a proactive on condition maintenance response.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated the preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
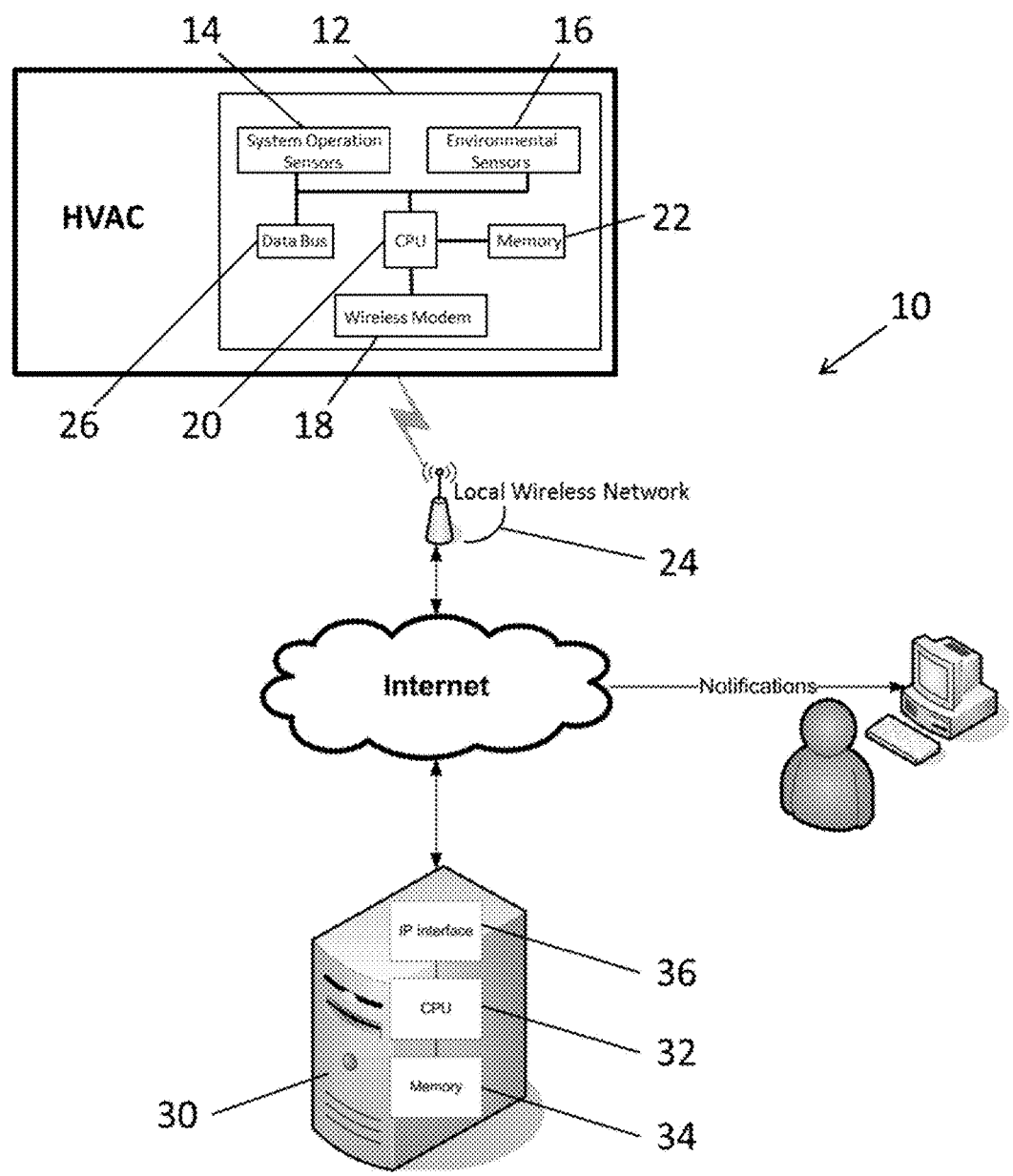
FIG. 1 is a block diagram of an HVAC condition based monitoring system constructed in accordance with the principals of the current invention.

With reference now to the drawings, and in particular to FIG. 1 thereof, the preferred embodiment of the new and improved HVAC condition based maintenance system and method embodying the principles and concepts of the present invention and generally designated by the reference numeral 10 will be described.

The present invention, the HVAC condition based maintenance system 10 and method is comprised of a plurality of components. Such components in their broadest context include a data acquisition device, sensors, and a remote server configured for storage, analysis and notification. Such components are individually configured and correlated with respect to each other so as to attain the desired objective.

The present invention essentially comprises an HVAC condition based maintenance system 10 comprising a data acquisition device installed within the HVAC system, the data acquisition device 12 comprising a plurality of data monitors, environmental sensors for detecting environmental conditions 16 and operational sensors for detecting operating conditions 14 of the HVAC system. A network interface device 18 connects the data acquisition device to a communication network. The data acquisition device has a processor 20 adapted for reading the data from the data monitors, analyzing the data to recognize immediate problem indicators and saving the data. The data is stored in memory 22 resident on the device. The data is transmitted over the communication network 24 based on detected changes of operational data, periodically or when faults are detected.

In one preferred embodiment, the plurality of data monitors is comprised of a voltage sensor, a temperature sensor, a humidity sensor, an air (atmospheric) pressure sensor, a condensate drain pan overflow safety switch sensor, and system control monitors for recognizing system controls states for various operating conditions such as heat on, fan on, and cooling on.

In another preferred embodiment, the network interface device is further defined as being a wireless network interface device.

The data acquisition device is configured to analyze operational and environmental data and recognize immediate problem indicators by recognizing changes indicative of an immediate problem such as the condensate drain pan overflow safety switch sensor on, and by analyzing operational and environmental data in combination, recognizing changes associated with system operational controls and environmental data such as cooling control on and no correlating change of temperature, fan control on and no correlating change in pressure, and heat control on and no correlating change in temperature.

A remote server 30 is configured with memory 34 for storing transmitted data and housing a historical database, a processor 32 for analyzing data to determining trends and recognizing fault indicators, and an IP interface 36 used as a means for receiving data and transmitting notifications based on recognized fault indicators.

An optional feature includes a data bus connection 26 for the monitoring of digital operational data in devices where operational status data is communicated digitally.

The process for analyzing data comprises algorithms for recognizing and predicting failures based on operational and environmental changes indicating conditions such as condensate overflow safety switch activation, operational status compared to environmental data such as cooling command activated with no correlated change in temperature and fan command activated with no correlated change in pressure.

The process for analyzing data comprises algorithms for comparing temperature changes, humidity changes and pressure changes over time intervals to historical temperature, humidity and pressure data changes over time intervals to identify routine maintenance needs.

The process for analyzing data comprises algorithms for comparing current operational and environmental data to historical operational and environmental data recognizing differences in operating trends to identify faults and predict failures.

In another preferred embodiment the process for analyzing data features the additional ability to incorporate past failure data when identifying performance reductions, impending failures with impending collateral damage and existing failures and determining a proactive on condition maintenance response.

Figure 2:
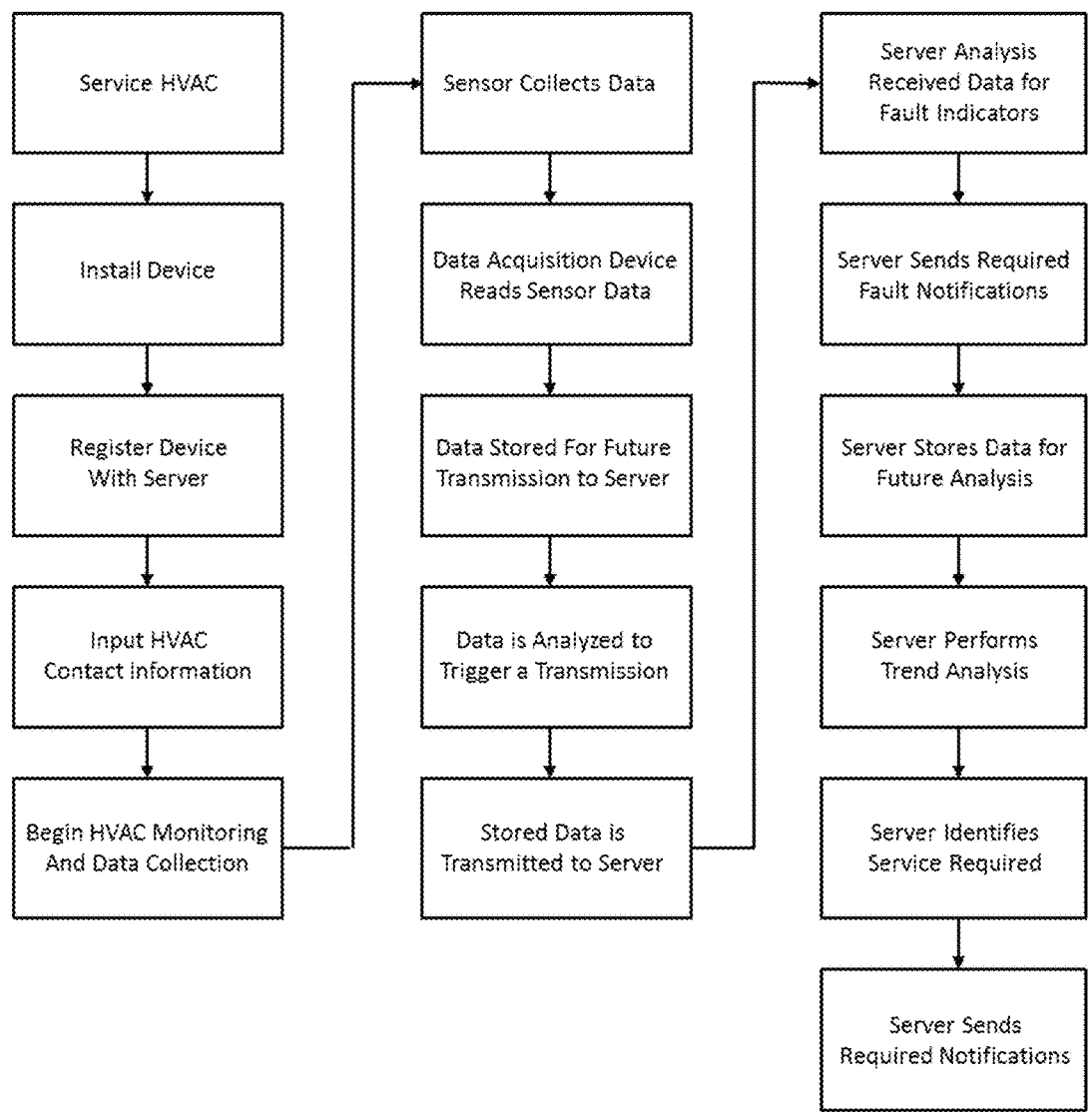
FIG. 2 is a block flow diagram of a performance monitoring method in accordance with the principals of the current invention.
Figure 3:
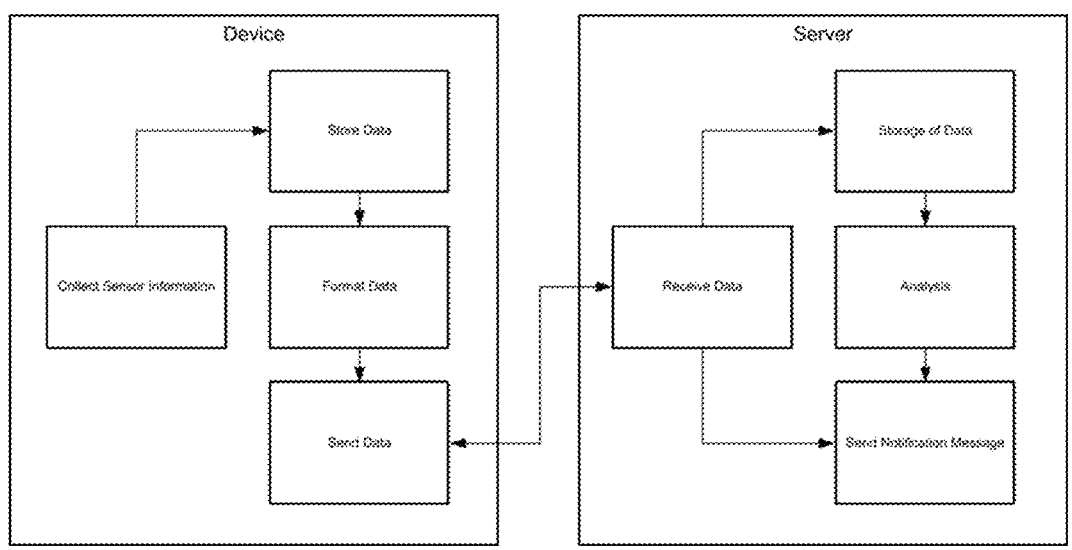
FIG. 3 is a block flow diagram of an HVAC condition based monitoring system showing the data flow through the system.

The invention also includes a method of using the systems as described above. FIGS. 2 and 3 illustrate the principle flow of a preferred method as described herein. The method is a performance monitoring method for continuously monitoring the HVAC operational and environmental data, identifying routine, impending and immediate problems, transmitting data to a remote server for analysis, trending and storage, and for triggering notification of failures and corrective action. The monitoring, identifying, transmitting, analyzing, trending, storage and notification being done in a safe, comfortable, convenient, efficient and economical manner, the method comprising, in combination, the steps as follows:

a. Providing service to the HVAC system to optimize the system performance and to determine optimal system operation.

b. Providing a data acquisition device for the monitoring of operational data and environmental data, the data acquisition device comprising a plurality of data monitors adapted to detect HVAC operational and environmental data, a processor adapted for reading the operational and environmental data from the plurality of data monitors, memory for temporary storage of operational data and environmental data, and a means for transmitting data.

c. Providing a remote server for remote data storage and analysis.

d. Defining contacts in the remote server associated with the HVAC system.

e. Registering the data acquisition device with the remote server to establish a communication link for the transmission of operational and environmental data.

f. The data acquisition device operating within the HVAC system to:
     1. Continuously monitor to detect changes in operational and environmental data, analyze the operational and environmental data and save the operational and environmental data based on detected changes.
     2. Recognize immediate problem indicators based on the operational and environmental data and triggering immediate transmission of immediate problem indicator data to the remote server.
     3. Continuously monitor to detect changes in and collect operational data and environmental data, analyze the operational data and environmental data and save operational data and environmental data based on detected changes and periodically when no changes are detected.
     4. Transmit the saved operational data and environmental data to the remote server on recognized operational sensor changes and periodically when no operational sensor changes occur.

g. The remote server receives the immediate problem indicator data, saving, analyzing and processing the immediate problem indicator data.

h. The remote server creates and sends alerts based on analysis of the immediate problem indicator data.

i. The remote server receives the operational data and environmental data, analyzing the operational data and environmental data, determining operating trends, saving the operational data and environmental data for analysis and maintaining the saved operational data and environmental data as historical data creating a historical database.

j. The remote server analyzes the environmental and operational data, identifying operational issues, comparing the current operating data trends to the historical data trends and recognizing the HVAC system's performance reductions, predicting impending failures with pending collateral damage, and detecting existing failures.

k. The remote server creates and sends a proactive on condition maintenance response based on the identified operational issues, the HVAC system's performance reductions, the impending failures with the impending collateral damage, and the existing failures.

In an alternate preferred method the remote server is additionally configured to identify a loss of communication to the data acquisition device.

In another preferred method the remote server is configured to monitor duty cycle operating time in combination with environmental data for extended cycle times to derive actual heat load characteristic of the building to recognize HVAC system deficiencies, building deficiencies, and installation issues and load imbalance of multi-unit systems.

The current invention is an easy to install HVAC Monitoring system that requires no subsequent adjustments or maintenance, configured to continuously acquire operating condition data to be transmitted for system specific analysis and trending at a remote location to provide advanced identification of required corrective action to remedy any reduction in system performance or prevent a future catastrophic failure. Notification of corrective action would be directed to both the system user and service representative to proactively address the issue while minimizing any possible collateral system damage. The Condition Based Maintenance System (CBMS) process can be incorporated into any HVAC system to ensure optimum operation, saving energy and the cost of unnecessary maintenance which includes the additional risk of unintended equipment damage incurred during maintenance. The condition based maintenance system derives HVAC system efficiency based on actual measured system performance as opposed to relying on the manufacture's published equipment ratings. The derived HVAC system efficiency allows the condition based maintenance system to identify of equipment deficiencies, installation issues and/or faulty equipment. The Condition Based Maintenance System provides measurements to identify improper balance in multi-system operations.

The methods and systems of the invention enable early detection of the HVAC system's performance reductions, impending failures, with impending collateral damage and existing failures to permit a proactive on condition maintenance response. The invention further facilitates the response by simultaneous communication of the maintenance needed to both the user and the user's HVAC service provider.

The performance monitoring methods of the invention also enables a dynamic efficiency evaluation of the entire building as an integrated system fully defining the building's performance, in lieu of the prevailing art of performing a load calculation through typical analysis considerations of the sum of its individual characteristics. Thus, the invention can identify HVAC equipment deficiencies and building deficiencies, HVAC installation issues and/or load imbalances with multiple units servicing an interconnected space.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. However, certain embodiments may have a different configuration and may exclude certain components or may include similar components. Therefore, such embodiments and any modification by addition or exclusion or certain components and without deterring the intended function of the system and method as is apparent from this description and drawings are also in the scope of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A heating, ventilation, and air conditioning performance monitoring method for identifying performance reductions, impending failures with impending collateral damage, and existing failures and permitting a maintenance response the method comprising:
    providing a heating, ventilation, and air conditioning system, the heating, ventilation, and air conditioning system comprising an air handler, a compressor, cooling coils, heating coils/element, a controller and air ducts;
    providing service to the heating, ventilation, and air conditioning system to optimize system performance and to establish optimal system operation;
    providing a data acquisition device, the data acquisition device comprising a plurality of data monitors for monitoring operational data and environmental data, a processor adapted for reading the operational data and the environmental data from the data monitors, memory for temporary storage of the operational data and the environmental data, and a network interface device for coupling the data acquisition device to a communication network;
    the plurality of data monitors including operational sensors detecting operational data based on heating, ventilation, and air conditioning operational conditions, the operational sensors comprising cool ON, cool OFF, heat ON, heat OFF, fan ON, fan OFF, voltage, time and condensate drain pan overflow safety switch;
    the plurality of data monitors also including environmental sensors to detect the environmental data based on environmental conditions, the environmental sensors comprising humidity, air temperature, air pressure;
    a data bus connection for the monitoring of digital operational data;
    installing the data acquisition device in the air handler and downstream of the cooling coils;
    providing a remote server for remote data storage and analysis;
    defining contacts in the remote server associated with the heating, ventilation, and air conditioning system;
    establishing communication between the data acquisition device and the remote server by registering the data acquisition device with the remote server;
    monitoring the operational data and the environmental data by the data acquisition device on a continuous basis,
    saving the operational data and the environmental data based on the operational data changes and the environmental data changes detected by the data acquisition device in the memory;

recognizing immediate problem indicator data based on the operational data and the environmental data by the data acquisition device, the immediate problem indicator data comprising condensate drain pan overflow safety switch sensor ON, cooling control ON and no correlating change of temperature, fan control ON and no correlating change in pressure, and heat control ON and no correlating change in temperature, storing the immediate problem indicator data;

transmitting of the immediate problem indicator data to the remote server by the data acquisition device;

receiving the immediate problem indicator data in the remote server;

saving the immediate problem indicator data in the remote server;

analyzing and processing the immediate problem indicator data in the remote server;

creating and sending alerts by the remote server based on the analysis of the immediate problem indicator data to the defined contacts;

defining periods for saving the operational data and the environmental data based on time when no operational changes occur;

defining an operating cycle consisting of two consecutive time periods, time OFF, time OFF defined as a first time period when the HVAC System is not operating followed by time ON, time ON defined a second time period when the HVAC System is operating;

recording precision time measurements for each of the time periods of the operating cycle;

saving the operational data and the environmental data based on the operating cycle and the defined periods;

transmitting the saved operational data and the saved environmental data by the data acquisition device based on the operating cycle and the defined periods to the remote server;

receiving the operational data and the environmental data in the remote server;

saving the operational data and the environmental data in the remote server;

defining a cooling conservation of energy algorithm for the operating cycle when cooling as the time OFF multiplied by energy gain is equal to the time ON multiplied by a result of energy removed minus energy gained during the operating cycle when cooling i.e. (Time OFF)×(Energy Gain)=(Time ON)×((Energy Removed)−(Energy Gained));

defining a heating conservation of energy algorithm for the operating cycle when heating as the time OFF multiplied by the energy gain is equal to the time ON multiplied by a result of energy added minus energy lost during the operating cycle when heating (TimeOFF)×(Energy Loss)=(TimeON)×((Energy Added)−(Energy Loss));

analyzing the operational data and the environmental data using the cooling conservation of energy algorithm and the heating conservation of energy algorithm in the remote server to determine current performance;

establishing a historical database composed of the environmental data and the operational data representative of past performance;

analyzing the historical database by the remote server using the cooling conservation of energy algorithm and the heating conservation of energy algorithm to determine historical performance data;

performing a trend analysis of the historical performance data to establish a baseline analogous to current performance data;

comparing the current performance data to the baseline to identify operational issues by
 a) recognizing the heating, ventilation, and air conditioning system performance reductions,
 b) detecting existing failures,
 c) predicting impending failures and impending collateral damage;

determining a service response; and configuring the remote server to create and send the service response to the defined contacts based on the identified operational issues.

2. The heating, ventilation, and air conditioning performance monitoring method of claim 1 wherein the analysis of the operational data and the environmental data by the remote server compares the current operating trends to the historical operating trends recognizing changes in pressure over time to identify faults and changes in heating, ventilation, and air conditioning system efficiency.

3. The heating, ventilation, and air conditioning performance monitoring method of claim 1 wherein recognizing the heating, ventilation, and air conditioning system performance reductions compares current operating trends to historical operating trends recognizing changes in the operating cycle over time to identify faults and changes in heating, ventilation, and air conditioning system efficiency.

4. The heating, ventilation, and air conditioning performance monitoring method of claim 1 wherein the remote server includes historical device failure information when recognizing device faults and predicting impending failures.

5. The heating, ventilation, and air conditioning performance monitoring method of claim 1 wherein the remote server is configured to identify a loss of communication with the data acquisition device.

6. The heating, ventilation, and air conditioning performance monitoring method of claim 1 wherein analyzing the operational data and the environmental data by the remote server comprises monitoring the time periods of the operating cycle in combination with the environmental data to derive actual heat load characteristic of the building, heating, ventilation, and air conditioning system deficiencies and installation issues and load imbalance of multi-unit systems.

* * * * *